(12) United States Patent
Dai et al.

(10) Patent No.: US 11,748,532 B1
(45) Date of Patent: Sep. 5, 2023

(54) ELECTROTHERMAL CO-SIMULATION METHOD, SYSTEM AND TERMINAL FOR THE POWER ELECTRONIC SYSTEM

(71) Applicant: Chengdu Fujin Power Semiconductor Technology Development Co., Ltd, Sichuan (CN)

(72) Inventors: Tongzhen Dai, Sichuan (CN); Gaoqiang Dai, Sichuan (CN); Fengxi He, Sichuan (CN); Xin Wang, Sichuan (CN); Yi Chen, Sichuan (CN)

( * ) Notice: Subject to any disclaimer, the term of this patent is extended or adjusted under 35 U.S.C. 154(b) by 0 days.

(21) Appl. No.: 18/151,850

(22) Filed: Jan. 9, 2023

(30) Foreign Application Priority Data

Apr. 24, 2022 (CN) .......................... 202210448636.7

(51) Int. Cl.
*G06F 30/20* (2020.01)
*H03K 3/011* (2006.01)

(52) U.S. Cl.
CPC ............. *G06F 30/20* (2020.01); *H03K 3/011* (2013.01)

(58) Field of Classification Search
CPC ................................ G06F 30/20; H03K 3/011
See application file for complete search history.

(56) References Cited

FOREIGN PATENT DOCUMENTS

| CN | 102368274 | A |   | 3/2012  |           |
|----|-----------|---|---|---------|-----------|
| CN | 103576561 | A |   | 2/2014  |           |
| CN | 106326532 | A |   | 1/2017  |           |
| CN | 108664675 | A |   | 10/2018 |           |
| CN | 109918700 | A |   | 6/2019  |           |
| CN | 110032086 | A |   | 7/2019  |           |
| CN | 110032086 | B |   | 8/2021  |           |
| CN | 113435090 | A | * | 9/2021  | G06F 30/23 |
| CN | 113657064 | A | * | 11/2021 | G06F 30/367 |

* cited by examiner

*Primary Examiner* — Chuen-Meei Gan

(57) ABSTRACT

The disclosure relates to the field of power electronic technology, and discloses an electrothermal co-simulation method, system and terminal for the power electronic system, comprising the following steps: carrying out electrical simulation on the power semiconductor device and its power circuit, and junction temperature simulation on the power semiconductor device; acquiring real-time electrical parameters in the electrical simulation process; suspending the electrical simulation in a steady state until the steady state of the electrical simulation is changed; and calculating the junction temperature according to the real-time electrical parameters and in combination with the real-time loss of the power semiconductor device in the electrical simulation process. The disclosure dynamically controls the electrical simulation state, thereby reducing the calculation amount in the simulation process and achieving the purpose of accelerating the simulation convergence.

7 Claims, 6 Drawing Sheets

ELECTROTHERMAL CO-SIMULATION METHOD, SYSTEM AND TERMINAL FOR THE POWER ELECTRONIC SYSTEM

TECHNICAL FIELD

The disclosure relates to the field of power electronics technology, in particular to an electrothermal co-simulation method, system and terminal for the power electronic system.

BACKGROUND

The power electronic system design generally includes software design and hardware design. The software design focuses on the electrical characteristics of the power electronic system, such as steady-state electrical parameters and transient response indicators, and generally adopts system-level simulation software to assist the design. The selection and design of power semiconductors is an important part of hardware design, and junction temperature calculation is also a crucial part. If the working temperature of a device exceeds the maximum junction temperature, the device may be damaged and fail subsequently. In order to ensure the normal operation of the power electronic system constituted by the power semiconductors, the junction temperature must be evaluated under various working conditions, and the junction temperature calculation needs to interact with the electrical parameters. At present, the industry usually separates the electrical evaluation of the power electronic system from the thermal evaluation of the power semiconductors for design and calculation separately.

Formula calculation is one of the common junction temperature evaluation methods at present. The principle is to summarize the steady-state voltage and current characteristics of the power semiconductors into mathematical formulas through the power electronic system analysis, and then manually calculate with the formulas. This method is very complicated. For different power electronic applications and independent innovative designs, designers need to derive mathematical formulas under various working conditions by themselves, which requires a high mathematical ability for designers. In addition, in the derivation process, it is generally necessary to make some approximations and conditional assumptions, which may affect the calculation accuracy.

On the other hand, the prior art proposes a junction temperature simulation system, which can calculate the power device loss and transient junction temperature change under the corresponding working conditions after the key application working condition parameters are input in the user interface and the software completes the device matching of the manufacturer. However, the system completes the junction temperature evaluation under a single working condition and cannot cover all working conditions at one time. Moreover, it does not have the ability to design the electrical characteristics of the power electronic system, and cannot carry out system-level electrical design and adjustment of control parameters at the same time. In addition, the prior art proposes an online junction temperature calculation method, which aims to solve the problem that it is difficult to directly measure the junction temperature of IGBT module online in actual devices. Although the method is conducive to the online integration of IGBT module status monitoring and health management, the method relies on actual products and the commissioning cost is relatively high, so it cannot provide junction temperature data reference in the early principle design stage. To sum up, it seems necessary to invent an electrothermal co-simulation method that can solve the problem of separated electrical and thermal evaluation of the power electronic system.

Furthermore, in the simulation process of the power electronic system, in order to ensure the simulation accuracy of the electrical model, it is necessary to set a small simulation step size, resulting in a slow simulation speed and it is generally unable to realize simulation analysis on a large time scale. While the time constant of the junction temperature simulation model is large, and it generally takes a long time scale to enter the steady state. Because the time constants of the electrical model and the thermal model are inconsistent, the simulation calculation amount is too large and the simulation is difficult to converge. How to accelerate the simulation convergence speed without sacrificing the simulation accuracy is an urgent technical problem to be solved at present.

SUMMARY

The purpose of the disclosure is to overcome the problems of the prior art and provide an electrothermal co-simulation method, system and terminal for the power electronic system.

The purpose of the disclosure is realized by the following technical solution: an electrothermal co-simulation method for the power electronic system, which specifically comprises the following steps:

carrying out electrical simulation on the power semiconductor device and its power circuit, and junction temperature simulation on the power semiconductor device;

acquiring real-time electrical parameters in the electrical simulation process;

dynamical control of the electrical simulation process: suspending the electrical simulation in a steady state until the steady state of the electrical simulation is changed;

calculating the junction temperature according to the real-time electrical parameters and in combination with the real-time loss of the power semiconductor device in the electrical simulation process. The real-time loss includes, but is not limited to, the switching loss, the on-state loss, and the total loss of the power semiconductor device.

Specifically, electrical simulation is to realize the simulation of dynamic electrical characteristics and on-state static electrical characteristics of the switching process of the power semiconductor device, that is, to simulate the electromagnetic behavior of the power semiconductor device. Junction temperature simulation is used to convert the real-time loss of the power semiconductor device into temperature change and further achieve the purpose of junction temperature calculation.

Specifically, the real-time electrical parameters include but are not limited to electrical parameters such as voltage and current, as well as junction temperature parameters, which are changed based on the specific power semiconductor device and the power electronic system.

Specifically, in order to overcome the problem that the simulation calculation is difficult to converge due to the inconsistent time constants of electrical simulation and thermal simulation, the electrical simulation is under dynamical control. When the electrical simulation enters the steady state, suspend its operation to release the corresponding computing resources, thus reducing the calculation amount in the process of electrothermal co-simulation, accelerating the speed of simulation convergence, and improving the simulation computation speed while ensuring the simulation accuracy. At the same time, when the steady state of the electrical simulation is changed, if other circuit functions need to be performed, the corresponding electrical simulation needs to be restarted. When it is determined that the electrical simulation is in a steady state, suspend the electrical simulation and maintain the electrical parameters under transmission to facilitate the continuous operation of the junction temperature simulation. Among them, whether the electrical simulation reaches a steady state can be known through the change of electrical parameters. For example, if the busbar voltage and current parameters of the power electronic system in which the power semiconductor device is included do not change or fluctuate within a small range (±10%), it is considered that the electrical simulation enters a steady state at this moment.

Through the method described in the example, electrical simulation and junction temperature simulation are realized at the same time, that is, it realizes the electrothermal co-simulation in the principle design stage, which can greatly improve the R&D efficiency of the power electronic system and effectively avoid the product development delay caused by the mismatch of electrical parameter design and power device selection.

In an example, the simulation models corresponding to the electrical simulation and the junction temperature simulation, and the data processing model corresponding to the electrical simulation process under dynamic control are all integrated on a system-level simulation platform, which facilitates the control of the three models and ensures that the three models perform electrothermal co-simulation at the same time.

In an example, the dynamic control of the electrical simulation process specifically includes:
  determining whether the electrical simulation is in a steady state according to the real-time electrical parameters;
  if no, continuing the electrical simulation;
  if yes, suspending the electrical simulation and maintaining the electrical parameters in the steady state, and then continuing the junction temperature simulation until the steady state of the electrical simulation is changed. As an embodiment, when the electrical simulation is suspended, the electrical parameters in the steady state are transmitted to the junction temperature simulation model through the data processing model or the data processor, so as to realize the electrothermal co-simulation control.

In an example, the step of carrying out electrical simulation on the power semiconductor device and its power circuit specifically includes:
  generating a drive signal of the power semiconductor device; performing the corresponding circuit functions by the power semiconductor device and its power circuit under the action of the drive signal. The drive signal is used to control the working state of the power semiconductor device or other components in the power circuit, so as to realize specific circuit functions, such as controlling the working state of the switching power supply, the working state of the photovoltaic inverter, or the switching state of the power semiconductor device. More specifically, the electrical simulation process further includes real-time signal acquisition, such as acquisition of real-time electrical parameters, for steady-state determination and subsequent junction temperature calculation. The drive signal in this example is generated based on PWM (pulse width modulation), SPWM (sinusoidal pulse width modulation), or SVPWM (space vector pulse width modulation).

In an example, the step of carrying out junction temperature simulation on the power semiconductor device includes:
calculating the real-time loss in the electrical simulation process of the power semiconductor device according to the real-time electrical parameters, and converting the real-time loss of the power semiconductor device into real-time temperature change, thereby realizing junction temperature simulation.

Further, the junction temperature simulation is specifically realized based on the heat conduction network, including any of the Causer network and the Foster network.

It should be further noted that the technical features corresponding to the above-mentioned examples may be combined or replaced with each other to form a new technical solution.

The disclosure further comprises an electrothermal co-simulation system for the power electronic system, which specifically includes:
  an electrical simulation model for carrying out electrical simulation on the power semiconductor device and its power circuit, and acquiring real-time electrical parameters in the electrical simulation process;
  a data processing model for suspending the electrical simulation in a steady state until the steady state of the electrical simulation is changed;
  a junction temperature simulation model for carrying out simulation on the power semiconductor device, and calculating the junction temperature according to the real-time electrical parameters and in combination with the real-time loss of the power semiconductor device in the electrical simulation process.

Among them, the above-mentioned electrical simulation model, data processing model and junction temperature simulation model are all integrated on the same system-level simulation platform. Corresponding electrical interfaces are provided between the electrical simulation model and the junction temperature simulation model to transmit necessary electrical parameters, thus realizing electrothermal co-simulation. Electrical parameters include but are not limited to electrical parameters such as voltage and current, as well as junction temperature parameters for realizing control of specific working conditions, such as early warning logic and derated operation in case of high junction temperature. At the same time, the electrical simulation model and the junction temperature simulation model are bidirectionally connected with the data processing model, which facilitates the data processing model to control the whole electrothermal co-simulation process.

In an example, the data processing model and the electrical simulation model are connected through an enable control interface, so that the data processing model can carry out enable control of the electrical simulation model, which specifically includes the following steps:
  determining whether the electrical simulation model is in a steady state according to the real-time electrical parameters;
  if no, continuing the electrical simulation model;
  if yes, suspending the electrical simulation model and maintaining the electrical parameters in the steady state, and then continuing the junction temperature simulation model until the steady state of the electrical simulation model is changed. As an embodiment, when the electrical simulation model is suspended, the electrical parameters in the steady state are transmitted to the junction temperature simulation model through the data processing model, so as to realize the electrothermal co-simulation control.

In an example, the electrical simulation model comprises a control circuit sub-model and a power circuit sub-model, and there is signal transmission between the power circuit sub-model and the control circuit sub-model, so that the overall power electronic system can realize predetermined functions. The interactive signals include but are not limited to voltage, current, and rotary encoder.

Specifically, the control circuit sub-model is a control mechanism that controls the power components in the power circuit sub-model to perform predetermined functions, and includes a drive signal generation unit for generating a drive signal of performing the corresponding circuit functions. The drive signal generation unit includes a control algorithm module and a pulse generation module, wherein the algorithm module obtains a target modulation signal based on the PWM, SPWM or SVPWM modulated input signal, and the pulse generation module generates a drive signal under the action of the target modulation signal to further control the switching state of the power semiconductor device in the power circuit sub-model, and cooperate with other components in the power circuit to achieve the predetermined control target. The control circuit sub-model further includes a signal acquisition unit for acquiring electrical parameters output by the power circuit sub-model. Preferably, the control circuit sub-model further comprises a signal conditioning unit for conditioning the acquired electrical parameters such as filtering and amplification, and finally transmitting the conditioned electrical parameters to the junction temperature simulation model and the data processing model, so as to ensure the simulation accuracy.

Specifically, the power circuit sub-model is used to perform corresponding circuit functions under the action of the drive signal, including the switching state of the power semiconductor device and the circuit functions realized by the power semiconductor device in cooperation with other components in the power circuit. The power circuit sub-model is the carrier for realizing the power conversion function of the power electronic system, and is used to build the power circuit corresponding to the power semiconductor device. The power semiconductor device may be a power diode, an insulated gate bipolar thyristor (IGBT), a metal oxide semiconductor field effect transistor (MOSFET), or a free combination thereof. The power circuit includes a different number of basic circuit components such as power semiconductor devices, power supplies, passive device, and motors. It is the carrier to realize the power conversion function of the power electronic system. The power supplies can be photovoltaic solar panels, batteries, or power grids; the passive devices include capacitors, inductors, and a free combination thereof; the motors can be different types of DC motors and AC motors.

In an example, the junction temperature simulation model comprises a loss calculation sub-model and a heat conduction sub-model.

Specifically, the loss calculation sub-model is used to calculate the real-time loss in the electrical simulation process of the power semiconductor device according to the real-time electrical parameters, and transmit the real-time loss to the heat conduction sub-model and the data processing model. Specifically, the real-time loss calculation can be divided into two cases according to the model functions of the system-level simulation platform:

(1) The simulation platform has the capability of simulating the characteristics of power semiconductor device. By inputting the parameters in reference to the device manual into the simulation model or directly obtaining the power device model from the power semiconductor manufacturer, the dynamic electrical characteristics and the on-state static electrical characteristics of the switching process of the power device can be simulated, so that the full-time waveforms of the terminal voltage u and the on-state current i of the power semiconductor device close to the practice can be easily obtained. At this time, the real-time power loss of the power device p=u*i can be obtained easily.

(2) The simulation platform only provides the simulation model of ideal power semiconductor device, and cannot simulate the real dynamic and static processes and static on-state characteristics of the power device. At this time, it is necessary to combine the real-time on-state current i of the power device transmitted by the electrical interface and the transient junction temperature $T_j$ fed back by the heat conduction sub-model, and fit the on-state voltage characteristic curve in the power device manual to obtain the on-state voltage $v_{on}(i, T_j)$, and then obtain the on-state loss $P_{on}=v_{on}(i,T_j)*i$; then, according to the on-state current i, the transient junction temperature $T_j$ and system busbar voltage $V_{CC}$, the single switching energy $E_{on+off}(i, V_{cc}, T_j)$ can be obtained by fitting the switching loss characteristic curve in the power device manual, and then the switching loss $p_{off}=f_{sw}*E_{on+off}(i, V_{cc}, T_j)$ can be obtained, where $f_{sw}$ is the switching frequency of the power device.

Specifically, the heat conduction sub-model is used to convert the real-time loss of the power semiconductor device into the real-time temperature change, and the Causer network or the Foster network can be used. More specifically, the heat conduction sub-model also calculates the junction temperature according to the real-time electrical parameters and in combination with the real-time loss of the power semiconductor device in the electrical simulation process. The specific calculation formula is as follows:

$$T_j = P*Z_{th}$$

where $T_j$ is the transient junction temperature, P is the total loss of the power semiconductor device, and $Z_{th}$ is the total thermal impedance of the heat conduction sub-model.

It should be further noted that the technical features corresponding to the above-mentioned examples may be combined or replaced with each other to form a new technical solution.

The disclosure further comprises a storage medium on which computer instructions are stored, and the steps of the electrothermal co-simulation method for the power electronic system formed by any one or more examples above are performed when the computer instructions are executed.

The disclosure further comprises a terminal including a memory and a processor, wherein computer instructions that can be operated in the processor are stored in the memory, and the steps of the electrothermal co-simulation method for the power electronic system formed by any one or more examples above are performed when the computer instructions are executed by the processor.

Compared with the prior art, the disclosure has the following beneficial effects:

The disclosure dynamically controls the electrical simulation process, thereby reducing the calculation amount in the simulation process and achieving the purpose of accelerating the simulation convergence. In addition, the disclosure realizes the electrothermal co-simulation in the principle design stage, which can greatly improve the R&D efficiency of the power electronic system and effectively avoid the product development delay caused by the mismatch of electrical parameter design and power device selection.

BRIEF DESCRIPTION OF DRAWINGS

The specific embodiments of the disclosure will be further detailed in combination with the drawings. The drawings illustrated herein are used to provide a further understanding of the present application and constitute a part of the present application. In the drawings, the same reference numeral is used to indicate the same or similar parts. The exemplary embodiments of the present application and descriptions thereof are not intended to limit the present application, but only to explain the present application.

DETAILED DESCRIPTION OF PREFERRED EMBODIMENT

The technical solutions of the disclosure will be clearly and completely described in conjunction with the drawings. Apparently, the embodiments described below are part, not all, of the embodiments of the disclosure. Based on the embodiments described herein, all other embodiments obtained by those of ordinary skill in the art without creative work are within the scope of the disclosure.

It needs to be noted that the directions or position relationships such as "central", "upper", "lower", "left", "right", "vertical", "horizontal", "inside", and "outside" in the description of the disclosure are based on those on drawings, and are used only for facilitating the description of the disclosure and for simplified description, not for indicating or implying that the target devices or components must have a special direction and be structured and operated at the special direction, therefore, they cannot be understood as the restrictions to the disclosure. Moreover, the ordinal numeral such as "first and second" and "first to the fourth" are used only for distinguishing objects, and are not limited to this sequence. They cannot be understood as an indication or implication of relative importance.

It needs to be noted in the description of the disclosure that unless otherwise specified or restricted, the words "installation", "interconnection", and "connection" shall be understood in a general sense. For example, the connection may be a fixed connection, removable connection, integrated connection, mechanical connection, electrical connection, direct connection, indirect connection through intermediate media, or connection between two components. Persons of ordinary skill in the art can understand the specific meanings of the terms above in the disclosure as the case may be.

Moreover, the technical characteristics involved in different embodiments of the disclosure as described below can be combined together provided there is no discrepancy among them.

Figure 1:
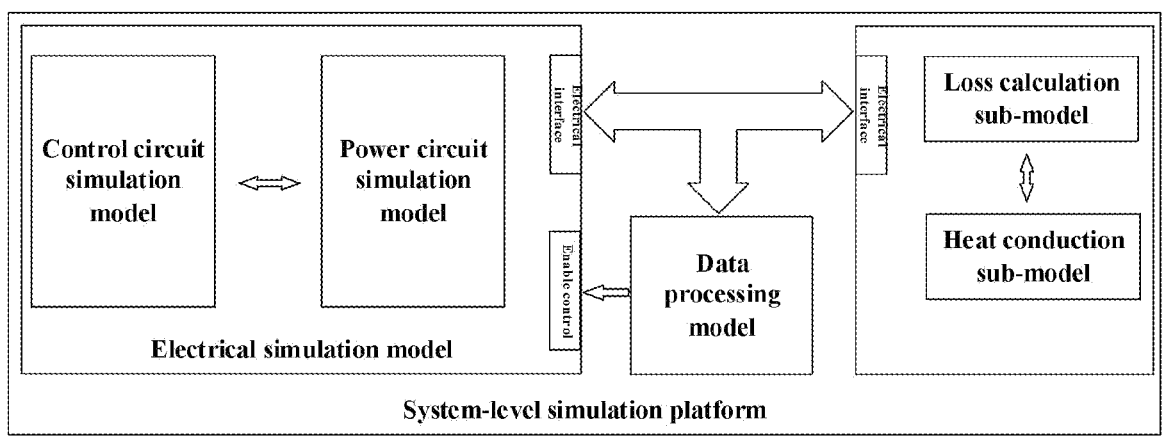
FIG. 1 is a system chart in an example of the disclosure.
Figure 2:
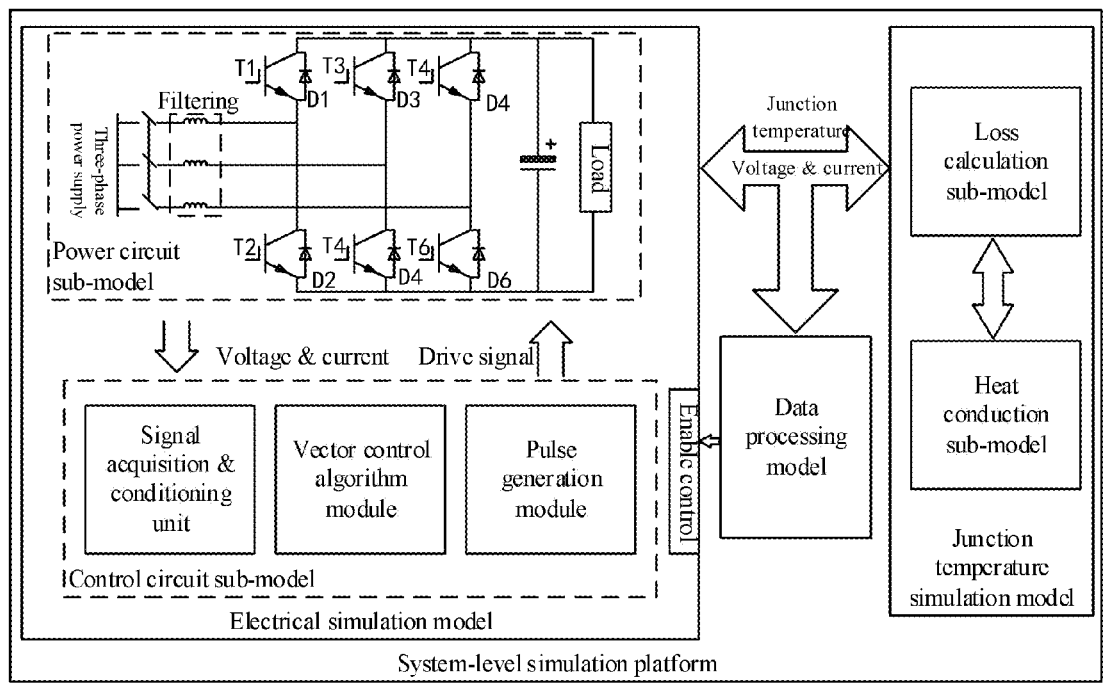
FIG. 2 is an electrothermal co-simulation system chart of the three-phase PWM rectifier of the disclosure.

The disclosure discloses an electrothermal co-simulation system for the power electronic system, which simultaneously builds the electrical simulation model, the junction temperature simulation model of the power device, and the data processing model for dynamically controlling the electrical simulation state on the same system-level simulation platform, so as to facilitate the designers to evaluate the overall system. Taking the electrothermal co-simulation of the three-phase PWM rectifier as an example for description, at this time, the system framework is shown in FIG. 1. Correspondingly, as shown in FIG. 2, the power circuit sub-model consists of the power supply, the passive filter unit, the power semiconductor device, the capacitor, and the load. The power semiconductor device consists of IGBTs (T1-T6) and anti-parallel diodes (D1-D6).

Figure 3:
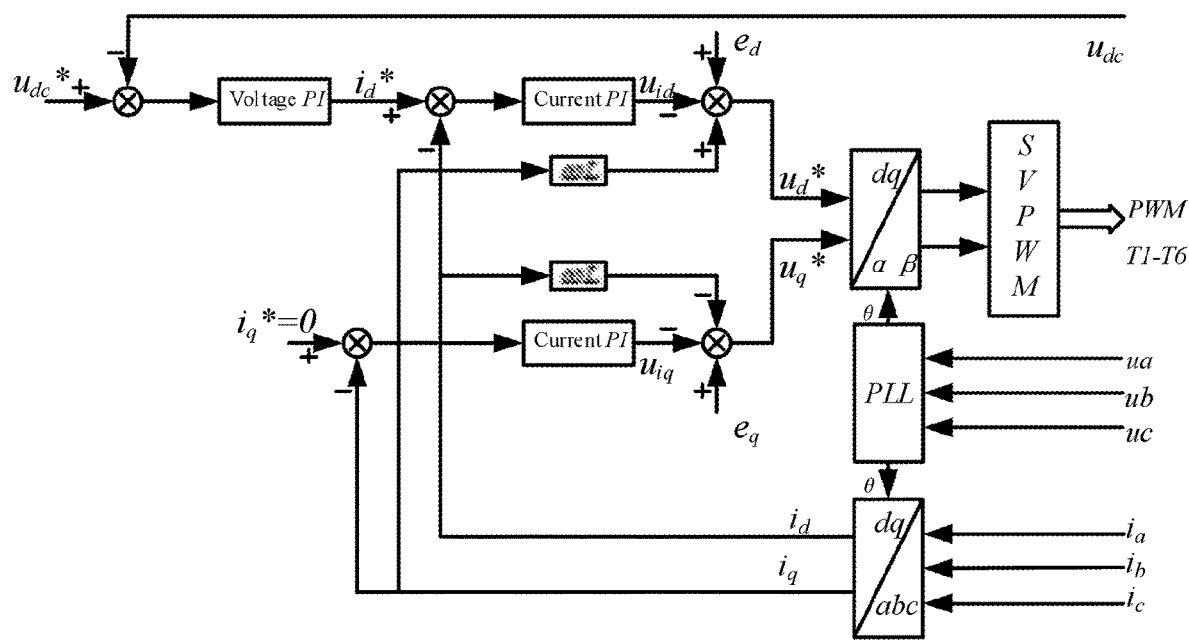
FIG. 3 is a vector control algorithm schematic diagram for electrothermal co-simulation of the three-phase PWM rectifier of the disclosure.

The control circuit sub-model includes a signal acquisition & conditioning unit and a drive signal generation unit. The drive signal generation unit includes a vector control algorithm module and a pulse generation module. The principle of the vector control algorithm is shown in FIG. 3. At this time, the input signal includes the three-phase voltages $u_a$, $u_b$, and $u_c$, the three-phase currents $i_a$, $i_b$, and $i_c$, and the DC busbar voltage $U_{dc}$. The vector control algorithm module includes one voltage PI outer-loop regulator, two current PI inner-loop regulators and one phase-locked loop (PLL), which are used to realize constant control of the DC busbar voltage and fast response to the parallel current. After the vector control algorithm unit obtains the target modulation voltage, the space vector pulse width modulation (SVPWM) generates a drive pulse signal to control the switching action of T1-T6 IGBTs in the power circuit and achieve the predetermined control target.

Figure 4:
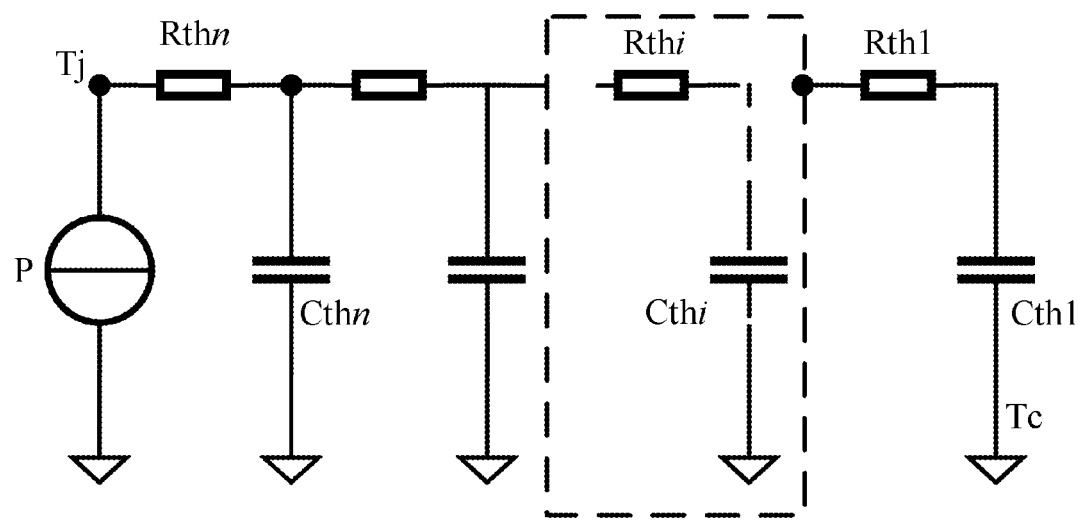
FIG. 4 is a model diagram of the Causer network in an example of the disclosure.
Figure 5:
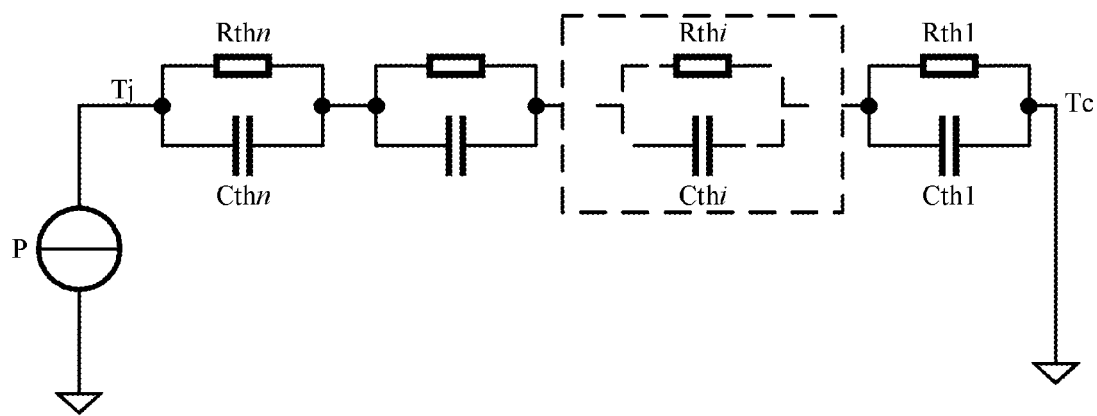
FIG. 5 is a model diagram of the Foster network in an example of the disclosure.

The junction temperature simulation model comprises a loss calculation sub-model and a heat conduction sub-model. Specifically, the heat conduction sub-model can use the Causer network or the Foster network. The model of Causer network is shown in FIG. 4, and the Foster network is another common heat transfer model, as shown in FIG. 5. where $R_{th}$ is the thermal resistance, and $C_{th}$ is the thermal capacitance. One thermal resistor and one thermal capacitor form a basic unit representing the heat transfer layer actually existing in the power semiconductor, such as the chip layer, the substrate layer, and the heat dissipation plate layer. $T_c$ is the reference temperature of the heat dissipation plate; P is the total loss of the power semiconductor.

In practical engineering calculations, the heat transfer time constant r is often defined with the following relationship:

$$C_{th}=\tau/R_{th}$$

According to the heat transfer network model, the total network thermal impedance $Z_{th}$ can be calculated as follows:

$$Z_{th} = R_{th1}\left(1-e^{\frac{-t}{\tau_1}}\right)+R_{th2}\left(1-e^{\frac{-t}{\tau_2}}\right)+\ldots+R_{th(n)}\left(1-e^{\frac{-t}{\tau_n}}\right)-=\sum_{i'=1}^{n}R_{th(i')}\left(1-e^{\frac{-t}{\tau_{i'}}}\right)$$

where t is time, i' and n are the lower and upper bounds of the summation operator, respectively, used to denote the number of thermal resistors, and e is the base of the natural function. Generally, the thermal resistance $R_{th}$ and the time constant r or the thermal resistance between different thermal conductive layers are given in the manual of power semiconductor device, so that the transient junction temperature $T_j$ of each thermal conductive layer of the power semiconductor can be obtained as follows:

$$T_j=P*Z_{th}$$

The loss calculation of the heat loss model in this embodiment requires the calculation of the on-state and switching losses of the IGBTs and the anti-parallel diodes. In order to simplify the electrical simulation model, the power semiconductor device in this embodiment uses an ideal device for the electrical simulation.

Figure 6:
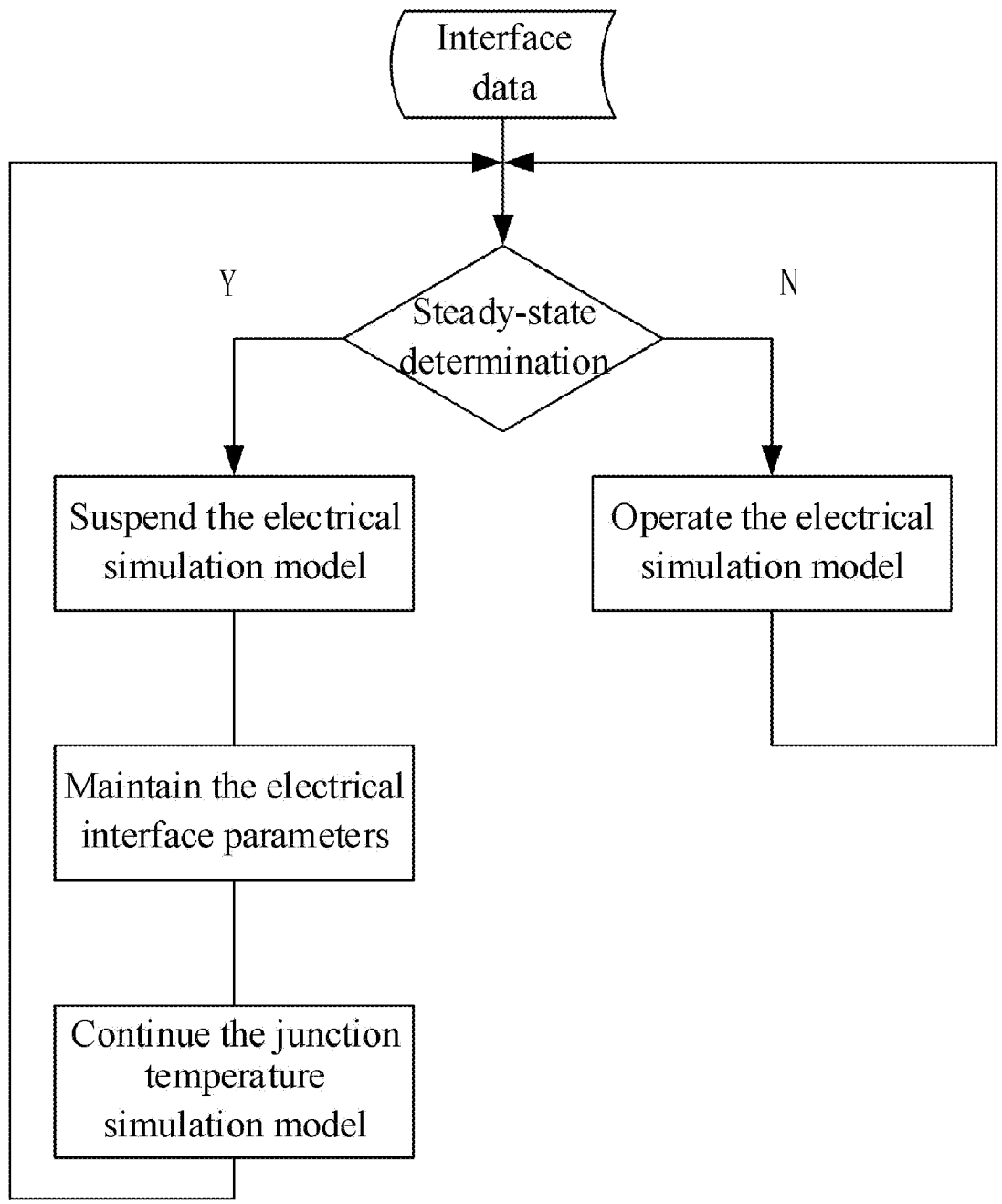
FIG. 6 is a schematic diagram of the electrical simulation dynamic control of the data processing model in electrothermal co-simulation of the three-phase PWM rectifier of the disclosure.

The disclosure further comprises an electrothermal co-simulation method for the power electronic system with the same inventive concept as the above simulation system, which specifically comprises:

The electrical simulation model, the data processing model and the junction temperature simulation model simultaneously start the electrothermal co-simulation. The control circuit sub-model generates a drive signal to control the working state of the three-phase PWM rectifier, synchronously acquires the real-time electrical parameters in the electrical simulation process of the three-phase PWM rectifier, and transmits the electrical parameters to the junction temperature simulation model for the calculation of junction temperature. As shown in FIG. 6, the dynamic control of the electrical simulation process of the three-phase PWM rectifier by the data processing model specifically comprises the following steps:

(1) determining the real-time busbar voltage and current in real time within a certain period of time. If they fluctuate within ±10%, it can be determined that the system enters a steady state;

(2) maintaining the interaction parameters necessary for the junction temperature simulation model and suspending the electrical simulation model by the data processing model;

(3) continuing to determine whether the "steady state" condition is changed in real time to decide whether to restart the electrical simulation model, and repeating the above steps (1)-(3).

Further, the electrothermal co-simulation method further includes calculating the junction temperature according to the real-time electrical parameters and in combination with the real-time loss of the power semiconductor device in the electrical simulation process. The specific loss calculation method is as follows:

On-state loss $P_{Ton}$ of the IGBTs:

$$P_{Ton}=V_{ce}*i_T$$

where $i_T$ is the on-state current of the IGBTs; $V_{ce}$ is the on-state voltage drop of the IGBTs, and the calculation formula is:

$$V_{ce}=f(i_T)=V_{ce0}(T_j)+r_{ce}(T_j)*i_T$$

where $f(i_T)$ is the calculation function of the on-state current of the IGBTs; $V_{ce0}$ is the on-state threshold voltage drop of the IGBTs. Since the on-state threshold voltage drop $V_{ce0}$ and the on-state resistance $r_{ce}$ of the power device vary with the transient junction temperature $T_j$, the curve provided by the power device manufacturer, is fitted as follows:

$$V_{ce0}(T_j) = V_{ce0}(25\square) + K_{tcv}(T_j)(T_j - 25\square)$$

$$r_{ce}(T_j) = r_{ce}(25\square) + K_{tcr}(T_j)(T_j - 25\square)$$

$$K_{tcv}(T_j) = \frac{V_{ce0}(125°\ C.) - V_{ce0}(25°\ C.)}{125°\ C.-25°\ C.}$$

$$K_{tcr}(T_j) = \frac{r_{ce}(125°\ C.) - r_{ce}(25°\ C.)}{125°\ C.-25°\ C.}$$

where $K_{tcv}$ is the temperature coefficient of on-state voltage drop of the IGBTs; $K_{tcr}$ is the temperature coefficient of on-state resistance of the IGBTs. The energy $E_{on}$ and $E_{off}$ of each switching process of the IGBTs vary with the on-state current $i_T$, the operating voltage $V_{cc}$ and the transient junction temperature $T_j$, and the curve provided by the power device manufacturer is fitted. The specific method is as follows:

Switching loss $P_{Tsw}$ of the IGBTs:

$$P_{Tsw} = f_{sw}(E_{on} + E_{off})\left(\frac{i}{i_{ref}}\right)^{K_i}\left(\frac{V_{cc}}{v_{ref}}\right)^{K_v}[1 + K_{tcsw}(T_j - T_{ref})]$$

where $f_{sw}$ is the switching frequency of the IGBTs; $E_{on}$ is the on-state energy of the IGBTs; $E_{off}$ is the off-state energy of the IGBTs; $i_{ref}$ is the reference current of the IGBTs; $V_{cc}$ is the operating voltage of the IGBTs; $v_{ref}$ is the reference voltage of the IGBTs; $T_{ref}$ is the reference temperature of the IGBTs; $K_i$, $K_v$ and $K_{tcsw}$ are correction coefficients, with typical values taken in engineering application.

Therefore, the total loss $P_{Tsum}$ of a single IGBT is as follows:

$$P_{Tsum}=P_{Ton}+P_{Tsw}$$

The calculation method of loss of anti-parallel diodes $P_{Don}$ is P the same, and the specific method is as follows:

$$P_{Don}=V_F*i_F$$

$$V_F=f(i_F)=V_{F0}(T_{Dj})+r_d(T_{Dj})*i_F$$

where $V_F$ is the on-state voltage drop of the power diodes; $V_{F0}$ is the on-state threshold voltage drop of the power diodes; $i_F$ is the on-state current of the power diodes; $f_{(iF)}$ is the calculation function of the on-state current of the power diodes; the on-state voltage drop $V_F$ and on-state resistance $r_d$ of the power diodes vary with the transient junction temperature $T_{Dj}$, so the curve provided by the power device manufacturer is fitted as follows:

$$V_{F0}(T_{Dj}) = V_{F0}(25\square) + K_{Dtcv}(T_{Dj})(T_{Dj} - 25\square)$$

$$r_d(T_{Dj}) = r_d(25\square) + K_{Dtcr}(T_{Dj})(T_{Dj} - 25\square)$$

$$K_{Dtcv}(T_{Dj}) = \frac{V_{F0}(125°\ C.) - V_{F0}(25°\ C.)}{125°\ C.-25°\ C.}$$

$$K_{Dtcr}(T_{Dj}) = \frac{r_d(125°\ C.) - r_d(25°\ C.)}{125°\ C.-25°\ C.}$$

where $K_{Dtcv}$ is the temperature coefficient of on-state voltage drop of the power diodes and $K_{Dtcr}$ is the temperature coefficient of on-state resistance of the power diodes. The energy $E_{rr}$ in the reverse recovery process of the diodes varies with the on-state current $i_F$, the operating voltage $V_{cc}$ and the junction temperature $T_{Dj}$. The curve provided by the power device manufacturer is fitted. The specific method is as follows:

Switching loss $P_{Dsw}$ of the power diodes:

$$P_{Dsw} = f_{sw}(E_{rr})\left(\frac{i_F}{i_{Dref}}\right)^{K_{Di}}\left(\frac{V_{cc}}{v_{Dref}}\right)^{K_{Dv}}[1 + K_{Dtcsw}(T_{Dj} - T_{Dref})]$$

where $f_{sw}$ is the switching frequency of the power diodes; $i_{Dref}$ is the reference current of the power diodes; $V_{cc}$ is the operating voltage of the power diodes; $v_{Dref}$ is the reference voltage of the power diode; $T_{Dref}$ is the reference temperature of the power diodes; $K_{Di}$, $K_{Dv}$ and $K_{Dtcsw}$ are correction coefficients, with typical values taken in engineering application.

Therefore, the total loss of a single anti-parallel diode is as follows:

$$P_{Dsum}=P_{Don}+P_{Dsw}$$

In the thermal conduction simulation model, the total thermal impedance of the IGBTs $Z_{Tth}$ and the total thermal impedance of the power diodes $Z_{Dth}$ are obtained by putting the thermal resistance $R_{th(i')}$ and the time constant $\tau_{i'}$ of each thermal conductive layer given in the manual of power semiconductor devices into the following formula for modeling. The calculation formula of the total thermal impedance is as follows:

$$Z_{th} = R_{th1}\left(1-e^{\frac{-t}{\tau_1}}\right)+R_{th2}\left(1-e^{\frac{-t}{\tau_2}}\right)+\ldots+R_{th(n)}\left(1-e^{\frac{-t}{\tau_n}}\right) = \sum_{i'=1}^{n} R_{th(i')}\left(1-e^{\frac{-t}{\tau_{i'}}}\right)$$

so that the transient junction temperature of the IGBTs $T_{Tj}$ and the transient junction temperature of the power diodes $T_{Dj}$ can be obtained as follows:

$$T_{Tj}=P_{Tsum}*Z_{Tth}+T_C$$

$$T_{Dj}=P_{Dsum}*Z_{Dth}+T_C$$

Further, the loss calculation can participate in the loss calculation through real-time current, and fully consider the influence of junction temperature on the on-state voltage drop. Compared with the traditional formula calculation, the workload is greatly simplified, and the calculation results are close to the engineering practice.

The disclosure further comprises a storage medium with the same inventive concept as the electrothermal co-simulation method for the power electronic system formed by any one or more examples above, on which computer instructions are stored, and the steps of the electrothermal co-simulation method for the power electronic system above are performed when the computer instructions are executed.

Based on such an understanding, the technical solution of this embodiment or the part that contributes to the prior art or the part of the technical solution can be embodied in the form of a software product, which is stored in a storage medium and includes several instructions causing a computer device (which can be a personal computer, a server, or a network device) to execute all or part of the steps of the method described in each embodiment of the disclosure. The storage medium includes: USB flash drive, mobile hard disk, read-only memory (ROM), random access memory (RAM), diskette or CD, and other media available for storage of program codes.

The disclosure further comprises a terminal including a memory and a processor with the same inventive concept as the electrothermal co-simulation method for the power electronic system formed by any one or more examples above, wherein computer instructions that can be operated in the processor are stored in the memory, and the steps of the electrothermal co-simulation method for the power electronic system above are performed when the computer instructions are executed by the processor. The processor may be a single-core or multi-core central processing unit or a specific integrated circuit, or one or more integrated circuits configured to implement the disclosure.

Each functional unit in the embodiments provided by the disclosure may be integrated into one processing unit, or each unit may exist independently and physically, or two or more units may be integrated into one unit.

The above specific embodiments are detailed descriptions of the disclosure, and it could not be considered that the specific embodiments of the disclosure are only limited to these descriptions. Persons of ordinary skill in the art of the disclosure could also make some simple deductions and substitutions without departing from the concept of the disclosure, which should be deemed to fall within the protection scope of the disclosure.

What is claimed is:

1. An electrothermal co-simulation method for a power electronic system, comprising the following steps:

carrying out electrical simulation of a power semiconductor device and its power circuit, and junction temperature simulation of the power semiconductor device;

acquiring real-time electrical parameters in the electrical simulation process;

suspending the electrical simulation in a steady state until the steady state of the electrical simulation is changed; and calculating a junction temperature according to the real-time electrical parameters and in combination with a real-time loss of the power semiconductor device in the electrical simulation process;

the simulation models corresponding to the electrical simulation and the junction temperature simulation, and a data processing model corresponding to the electrical simulation process under dynamic control are all integrated on a system-level simulation platform, which facilitates a control of the three models and ensures that the three models perform electrothermal co-simulation at the same time;

wherein the step of suspending the electrical simulation in the steady state until the steady state of the electrical simulation is changed specifically to reduce workload of the system-level simulation platform includes:

determining whether the electrical simulation is in steady state according to the real-time electrical parameters;

if no, continuing the electrical simulation; and if yes, suspending the electrical simulation and maintaining the electrical parameters in the steady state, and then continuing the junction temperature simulation until the steady state of the electrical simulation is changed.

2. The electrothermal co-simulation method for the power electronic system of claim 1, wherein the step of carrying out electrical simulation of the power semiconductor device and its power circuit specifically includes:

generating a drive signal of the power semiconductor device;

performing the corresponding circuit functions by the power semiconductor device and its power circuit under the action of the drive signal.

3. The electrothermal co-simulation method for the power electronic system of claim 1, wherein the step of carrying out junction temperature simulation of the power semiconductor device includes:

calculating the real-time loss in the electrical simulation process of the power semiconductor device according to the real-time electrical parameters;

converting the real-time loss of the power semiconductor device into real-time temperature change, thereby realizing junction temperature simulation.

4. An electrothermal co-simulation system for a power electronic system, comprising:

a computing system having a memory and a processor, the computing system having a set of models stored on the memory and processed by the processor, the models comprising:

an electrical simulation model for carrying out electrical simulation on the of a power semiconductor device and its power circuit, and acquiring real-time electrical parameters in the electrical simulation process;

a data processing model for suspending the electrical simulation in a steady state until the steady state of the electrical simulation is changed;

a junction temperature simulation model for carrying out simulation of the power semiconductor device, and calculating a junction temperature according to the real-time electrical parameters and in combination with a real-time loss of the power semiconductor device in the electrical simulation process;

the electrical simulation model, the data processing model and the junction temperature simulation model are all integrated on the same system-level simulation platform; and the electrical simulation model and the junction temperature simulation model are bidirectionally connected with the data processing model, which facilitates the data processing model to control the whole electrothermal co-simulation process and ensures that the three models perform electrothermal co-simulation at the same time;

wherein the step of suspending the electrical simulation model in the steady state until the steady state of the electrical simulation model is changed to reduce workload of the system-level simulation platform includes:

determining whether the electrical simulation model is in steady state according to the real-time electrical parameters;

if no, continuing the electrical simulation model; and if yes, suspending the electrical simulation model and maintaining the electrical parameters in the steady state, and then continuing the junction temperature simulation model until the steady state of the electrical simulation model is changed.

5. The electrothermal co-simulation system for the power electronic system of claim 4, wherein the electrical simulation model comprises a control circuit sub-model and a power circuit sub-model;

the control circuit sub-model is used to generate a drive signal of the power semiconductor device, acquire the real-time electrical parameters in the electrical simulation process, and transmit the real-time electrical parameters to the junction temperature simulation model and the data processing model;

the power circuit sub-model is used to perform corresponding circuit functions under the action of the drive signal.

6. The electrothermal co-simulation system for the power electronic system of claim 4, wherein the junction temperature simulation model comprises a loss calculation sub-model and a heat conduction sub-model;

the loss calculation sub-model is used to calculate the real-time loss in the electrical simulation process of the power semiconductor device according to the real-time electrical parameters, and transmit the real-time loss to the heat conduction sub-model and the data processing model;

the heat conduction sub-model is used to convert the real-time loss of the power semiconductor device into real-time temperature change, and calculate the junction temperature according to the real-time electrical parameters and in combination with the real-time loss of the power semiconductor device in the electrical simulation process.

7. A terminal including a memory and a processor, wherein computer instructions that can be operated in the processor are stored on the memory, and the steps of the electrothermal co-simulation method for the power electronic system according to claim 1 are performed when the computer instructions are executed by the processor.

\* \* \* \* \*